(12) United States Patent
Bourdaillet et al.

(10) Patent No.: US 9,036,806 B1
(45) Date of Patent: May 19, 2015

(54) PREDICTING THE CLASS OF FUTURE CUSTOMER CALLS IN A CALL CENTER

(71) Applicant: Xerox Corporation, Norwalk, CT (US)

(72) Inventors: Julien Jean Lucien Bourdaillet, Rochester, NY (US); Yasmine Charif, Rochester, NY (US); Andres Quiroz Hernandez, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/470,186

(22) Filed: Aug. 27, 2014

(51) Int. Cl.
*H04M 3/00* (2006.01)
*H04M 5/00* (2006.01)
*H04M 3/51* (2006.01)
*G06Q 10/04* (2012.01)
*H04M 3/42* (2006.01)

(52) U.S. Cl.
CPC ............... *H04M 3/51* (2013.01); *G06Q 10/04* (2013.01); *H04M 3/42034* (2013.01)

(58) Field of Classification Search
CPC .......... H04M 2242/22; H04M 3/5183; H04M 5/523; H04M 3/5166; H04M 3/2218; H04M 3/5191
USPC ............... 379/265.09, 243, 266.1, 266.08, 379/265.01, 265.11, 265.13, 242
See application file for complete search history.

(56) References Cited

U.S. PATENT DOCUMENTS

| | | | |
|---|---|---|---|
| 5,684,872 A | 11/1997 | Flockhart et al. | |
| 6,163,607 A | 12/2000 | Bogart et al. | |
| 6,614,903 B1 | 9/2003 | Flockhart et al. | |
| 7,526,079 B2 * | 4/2009 | Mello | 379/212.01 |
| 8,923,505 B2 * | 12/2014 | Mergen | 379/266.1 |
| 2013/0136252 A1 | 5/2013 | Kosiba et al. | |

FOREIGN PATENT DOCUMENTS

EP 0755144 A2 1/1997

OTHER PUBLICATIONS

Galen Andrew et al., "Scalable Training of L1-Regularized Log-Linear Models", Appearing in Proceedings of the 24 th International Conference on Machine Learning, Corvallis, OR, 2007. Copyright 2007 by the author(s)/owner(s), pp. 1-8.

(Continued)

*Primary Examiner* — Thjuan K Addy
(74) *Attorney, Agent, or Firm* — Gibb & Riley, LLC

(57) ABSTRACT

A system and method for predicting the class of future customer calls to a call center. Saved call data is analyzed using a robust tokenizer of a computerized device. The tokenizer transforms a sequence of characters in a call summary field of the saved call data into a sequence of tokens. Tokenized call data is produced. Multiple maximum entropy (MaxEnt) models are created based on the tokenized call data, using the computerized device. The MaxEnt models produce a probability distribution of all classes for a next call to a call center. A conditional random field (CRF) classifier is trained with the MaxEnt models and information from the saved call data, using the computerized device. The CRF classifier uses chronologically ordered sequences of prior calls to the call center and predicts a class for a new call to the call center based on the saved call data. A call class prediction is produced for the new call received from a returning customer based on the CRF classifier and the MaxEnt model.

20 Claims, 6 Drawing Sheets

(56) References Cited

OTHER PUBLICATIONS

Charles Sutton et al., http://people.cs.umass.edu/~mccallum/papers/crf-tutorial.pdf, "An Introduction to Conditional Random Fields for Relational Learning", pp. 1-35, Aug. 27, 2014.

John Lafferty et al., "Conditional Random Fields: Probabilistic Models for Segmenting and Labeling Sequence Data", Proceedings of the 18th International Conference on Machine Learning 2001 (ICML 2001), pp. 282-289.

Kamal Nigam et al., "Using Maximum Entropy for Text Classifation", www.kamalnigam.com/papers/maxent-ijcaiws99.pdf, Aug. 27, 2014, pp. 1-7.

Fei Sha et al., "Shallow Parsing with Conditional Random Fields", www-bcf.usc.edu/~feisha/pubs/shallow03.pdf, Aug. 27, 2014, pp. 1-8.

* cited by examiner

- 001222586,J49/J49L GYURISCOTT555-999-3222CALLED TO HAVE HER CASE CLOSED SHE IS MOVING OUT OF STATE
- CID-00011111-SNAPCW-BH3/BL8K.HAMBLETON555-222-6622ATLANTIS MIDTOWN CLIENT NEED TO SPEAK WITH WORKER ABOUT CASE INFORMATION...CSC

--------From: Chariton De La FontaineSent: Wednesday, April 11, 2012 8:27:58 AMTo: DSS LACSCSubject: FW: SRNO:444444-999999999:1st Request-J REDDAuto forwarded by a Rulecontacted client - she is to supply wage verification today so that her case will not closeChariton De La Fontaine, SSA2P.O. Box 000Coconut Grove, LA 77777777-444-3366-----Original Message-----From: LACSC@DSS.LA.Gov [mailto:LACSC@DSS.LA.Gov]Sent: Wednesday, April 11, 2012 8:08 AMTo: Torny Walterson; Chariton De La Fontaine; DCFS CommunicationsSubject: SRNO:444444-999999999:1st Request-J REDDPurpose of the Call: :
CID:001111111Work Number : 00Name :J REDDDOB:NAWORKER / CASELOAD:R14/R14PARISH:00 EAST HYMNALCALLER NAME:E. MCGUIRECALLER PHONE NUMBER:333-444-5544REASON:SNAP CASE STATUS
- CELIA HILTON,CSE IN MS,CI TO SPEAK WITH CSW RE:STATUS OF CASE,CB @666-444-2211,1ST REQUEST EMAIL
- UPDATED PH. AP ASKED WHY ARRS BAL DIDN'T DEC IF HE'S PAYINGTOWARDS ARRS. EXPL IF PYMT NOT MADE BY 9TH OBLI WILL GO TOARRS. AP DISAGREES W/ ARRS. EDU WOULD NOTIFY CW TO COMPLETEAN AUDIT. AP REQ LAST PYMT. DIRECTED TO AVR/WEB. AP ASKED WHY INTERCEPT PYMT DIDN'T POST. EDU WILL BE HELD FOR 6 MONTHS. FYI EMAIL
- cp ci to req 12 mth pymt history, cp provided dss website and was assisted in printing history. no email..

FIG. 3

PREDICTING THE CLASS OF FUTURE
CUSTOMER CALLS IN A CALL CENTER

BACKGROUND

Systems and methods herein generally relate to call center operation and, in particular, to predicting the class of future customer calls to a call center.

Call centers typically deal with huge volumes of incoming phone calls. Currently, when a customer calls a call center, the agent who answers the call has no idea on the subject of the incoming call. With no prior information on the upcoming conversation, other than a general topic out of a few that an Interactive Voice Response Unit (IVR) may suggest, each agent needs to properly interpret the problem formulation described by the customer. This process takes time, including when it is a recurring issue or when the customer is calling for a follow-up on an existing issue. Moreover, misunderstandings often slow down the process.

Enabling call center agents to anticipate future incoming calls would result in faster and more efficient interactions. Predicting the precise class/type of a future call for a given customer would be immensely helpful for seamless interactions, better customer satisfaction, and increased agent productivity. Further, pragmatic staffing strategies could be put in place, as well as a better call assignment according to agents, based on performance on call types. A sound prediction model would need to leverage agent operational workflows while dealing with very noisy data stored in call center databases and accounting for existing information as training features.

SUMMARY

According to one exemplary computer implemented method of predicting the class of future customer calls to a call center, a graphical user interface is provided. The graphical user interface includes prior call information comprising a call summary field that includes an assigned call class. Data in the call summary field is analyzed using a tokenizer. The tokenizer transforms a sequence of characters in the call summary field into a sequence of tokens and produces tokenized call data. A maximum entropy (MaxEnt) model is defined. The MaxEnt model produces a probability distribution of all classes for a next call to the call center based on the prior call information. Parameters of a maximum entropy (MaxEnt) model are estimated for each agent of the call center based on the tokenized call data. A conditional random field (CRF) classifier is trained using chronologically ordered sequences of prior calls to the call center. The CRF classifier predicts a class for a new call to the call center based on the prior call information. A new call is received from a returning customer. A call class prediction for the new call received from the returning customer is obtained based on the CRF classifier and the MaxEnt model. The call class prediction for the new call received from the returning customer is visually displayed on the graphical user interface.

According to another exemplary method herein, saved call data is analyzed using a tokenizer of a computerized device. The tokenizer transforms a sequence of characters in a call summary field of the saved call data into a sequence of tokens. Tokenized call data is produced. A maximum entropy (MaxEnt) model is created based on the tokenized call data, using the computerized device. The MaxEnt model produces a probability distribution of all classes for a next call to a call center. A conditional random field (CRF) classifier is trained with the MaxEnt model and information from the saved call data, using the computerized device. The CRF classifier uses chronologically ordered sequences of prior calls to the call center and predicts a class for a new call to the call center based on the saved call data. A call class prediction is produced for the new call received from a returning customer based on the CRF classifier and the MaxEnt model.

According to one exemplary system for processing communications in a call center, the system comprises a database storing records of received calls to the call center. The records comprise call information comprising a call summary field that includes an assigned call class. A processor is connected to the database. The processor comprises a tokenizer. A graphical user interface is connected to the processor. The processor analyzes the call summary field in the records of received calls using the tokenizer. The tokenizer transforms a sequence of characters in the call summary field into a sequence of tokens, producing tokenized call data. The processor creates maximum entropy (MaxEnt) models based on the tokenized call data. The MaxEnt models produce a probability distribution of all classes for a next call to the call center. The processor trains a conditional random field (CRF) classifier with the MaxEnt models and the call information from the records of received calls. The CRF classifier uses chronologically ordered sequences of prior calls to the call center and predicts a class for a new call to the call center based on the records of calls to the call center stored in the database. The processor produces a call class prediction for a received call based on the CRF classifier and the MaxEnt models. The processor displays the call class prediction for the received call on the graphical user interface.

These and other features are described in, or are apparent from, the following detailed description.

BRIEF DESCRIPTION OF THE DRAWINGS

Various examples of the systems and methods are described in detail below, with reference to the attached drawing figures, which are not necessarily drawn to scale and in which:

FIG. 3 illustrates an example of a call center report according to systems and methods herein;

DETAILED DESCRIPTION

Figure 1:
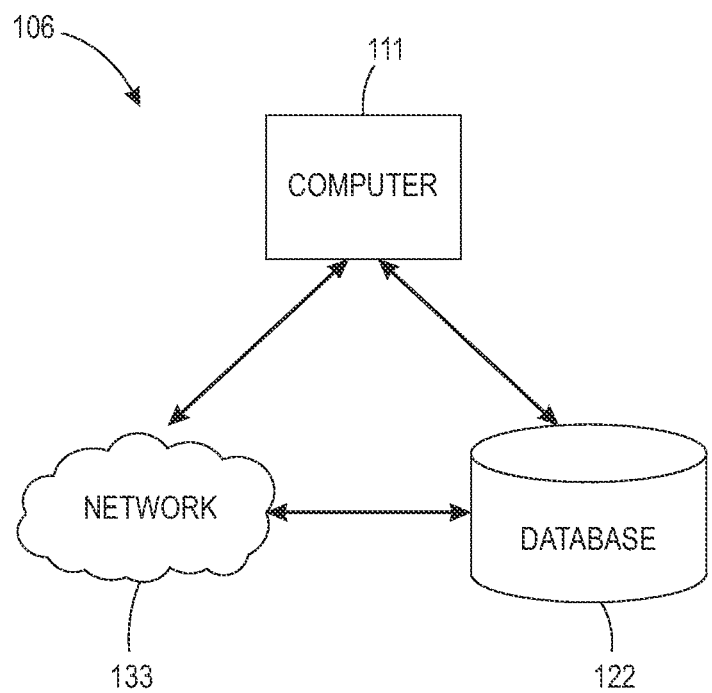
FIG. 1 is a block diagram of a system according to systems and methods herein.

For a general understanding of the features of the disclosure, reference is made to the drawings. In the drawings, like reference numerals have been used throughout to identify identical elements. While the disclosure will be described hereinafter in connection with specific devices and methods thereof, it will be understood that limiting the disclosure to such specific devices and methods is not intended. On the contrary, it is intended to cover all alternatives, modifications, and equivalents as may be included within the spirit and scope of the disclosure as defined by the appended claims.

Disclosed herein are methods and systems for predicting the class of future calls made to a call center by returning customers. The disclosed methods exploit free human expert labeling in the training of its prediction model. The methods also account for the sequential nature of customers' calls and their time/distance relevance to make each prediction. Furthermore, the systems and methods herein construct a separate model for agents to account for the agents' writing styles in order to discriminate relevant features in human entered texts, and use the agent model's prediction as a secondary opinion, along with other features in the main prediction model.

FIG. 1 is a general overview block diagram of a system, indicated generally as 106, for communication between a computer 111 and a database 122. The computer 111 may comprise any form of processor as described in further detail below. The computer 111 can be programmed with appropriate application software to implement the methods described herein. Alternatively, the computer 111 may comprise a special purpose machine that is specialized for processing calls through a call center and includes a dedicated processor that would not operate like a general purpose processor because the dedicated processor has application specific integrated circuits (ASIC's) that are specialized for the handling of telecommunications operations, processing voice data, distributing incoming phone calls among multiple call center staff, etc. In one example, the computer 111 is a special purpose machine that includes a specialized sound card having unique ASIC's for providing clear sound and voice processing, includes specialized boards having unique ASIC's for input and output devices to speed telecommunications processing, a specialized ASIC processor that performs the logic of the methods described herein (such as the processing shown in FIG. 4) using dedicated unique hardware logic circuits, etc.

Database 122 includes any database or any set of records or data that the computer 111 desires to retrieve. Database 122 may be any organized collection of data operating with any type of database management system. The database 122 may contain matrices of datasets comprising multi-relational data elements.

The database 122 may communicate with the computer 111 directly. Alternatively, the database 122 may communicate with the computer 111 over network 133. The network 133 comprises a communication network either internal or external, for affecting communication between the computer 111 and the database 122. For example, network 133 may comprise a local area network (LAN) or a global computer network, such as the Internet.

According to systems and methods herein, noisy call summaries may be processed via a special tokenization method that is robust to very noisy English text data. Once tokenized, the call summaries are used to estimate the parameters of maximum entropy (MaxEnt) models. There is one MaxEnt model per agent, each of which provides a class prediction for the next call given a call summary, a call class, and an agent. The MaxEnt agent model, along with other textual, sequence, and demographic features, is used to train a conditional random field (CRF) classifier. The resulting prediction model displays predictions online and in real-time. Because the disclosed system can compute its own accuracy rate, system retraining may be triggered only when needed.

Some of the benefits of the systems disclosed herein include:
a) its accuracy benefits from the human labeling available for all stored calls,
b) it considers both the time factor when accounting for previous calls information and the contextual call information,
c) it accounts for agents' writing styles to discriminate relevant features in textual fields,
d) it defines a robust tokenizer to deal with very noisy textual data, and
e) it triggers retraining only when appropriate, etc.

According to systems and methods herein, the process takes into account agents and their writing styles to discriminate relevant features for the prediction. The process considers both the relevance according to the time factor, when accounting for previous calls information, and contextual information about the present call (such as call summaries and user demographic information) to make its predictions. The system herein defines a robust tokenizer to deal with very noisy textual data and relies on a sound probabilistic model that embeds a secondary prediction model to make predictions. Moreover, the process is adaptive: that is, the more calls the center receives, the better the predictions are, and, retraining of the prediction's model is performed when needed.

The process disclosed herein predicts future call classes for returning customers. Therefore, the process helps call center agents to better comprehend customer requests, resulting in less frustration at both ends and productivity gains for the call center as a whole. The system herein enables the computation of the distribution of future call classes and therefore provides indicators to call center management for training areas and on-demand staffing.

One call class prediction model uses a database of customer calls comprising very noisy summary fields. The noise can be caused by: 1) lack of conventions and natural differences in agent writing styles, and 2) a summary field containing a wide variety of miscellaneous textual data, including actual summaries written by agents as part of their post-call processing operations, as well as e-mails, and other machine generated data.

According to systems and methods herein, call class prediction may employ the following call center agent workflow after they finished handling a call:
1) The agent writes a summary of the call in plain native language (e.g., English), possibly using domain abbreviations, acronyms, and short segments. The call summary is stored in the record associated with the call. This call summary describes the understanding of the agent of the needs of the customer and how the agent addressed them through the call.
2) The agent assigns a class to the call according to an existing classification, e.g., billing, inquiry, child support, etc. Depending on the class of calls processed by a particular call center, the list of classifications for incoming calls can be established by management, based on user needs. Since the list of classifications is available to call center agents, the agents can rely on this classification to assign a class to a call during post-call processing.

Each processed call is stored in the database with its call summary and the assigned call class. Because of this, the proposed prediction method can exploit the call center agents' workflow by incorporating their everyday operations as free human expert labeling in a sequence classifier. This, in turn, greatly benefits the prediction accuracy, since an expert's feedback is classically an expensive step that is not generally available for training classifiers (i.e., the expert cannot label a lot of data and (s)he cannot do it on a regular basis).

In addition, the prediction method accounts for the various writing styles of the agents in order to discriminate relevant textual features so as to make the prediction. Maximum entropy (MaxEnt) agent models are built and trained. The predictions from the MaxEnt agent models are incorporated to a conditional random field (CRF) sequence classifier (the main prediction model) and are used as a secondary 'opinion' to make the predictions. The use of MaxEnt and CRF is explained in the following sections.

Finally, the system is adaptive as it benefits from more call data. Retraining of the system is only triggered when appropriate. Indeed, because it has access for each call to both the prediction made and the actual call class assigned by the agent, the system can calculate its own prediction accuracy rate. The retraining could therefore be triggered only if the prediction accuracy rate falls under a predetermined threshold.

The result of this is a prediction method and system that:
1) builds offline a probabilistic model that exploits free agent labeling, constructs and uses agent models to discriminate relevant textual data from very noisy data, and leverages sequences of customer calls while accounting for their time distance,
2) makes online predictions in real-time, and
3) only fires its prediction model's retraining when needed.

The call class prediction method described herein operates in three main phases:
1) (Offline) Build the prediction model.
2) (Online) Use the prediction model to predict the class of incoming calls.
3) (Offline) Improve the prediction model with new data, when appropriate.

Build the Prediction Model.

The prediction model is built to deal with very noisy call data. The call center data is used to build and train a CRF prediction model, which was chosen because of its suitability in applications where the classes of a sequence of data points have to be predicted. CRFs may be used to encode known relationships between observations and to construct consistent interpretations of the data. This is the case for the call class prediction problem that accounts for all calls made by a customer to a call center (and represents the calls as a sequence of data points).

Figure 2:
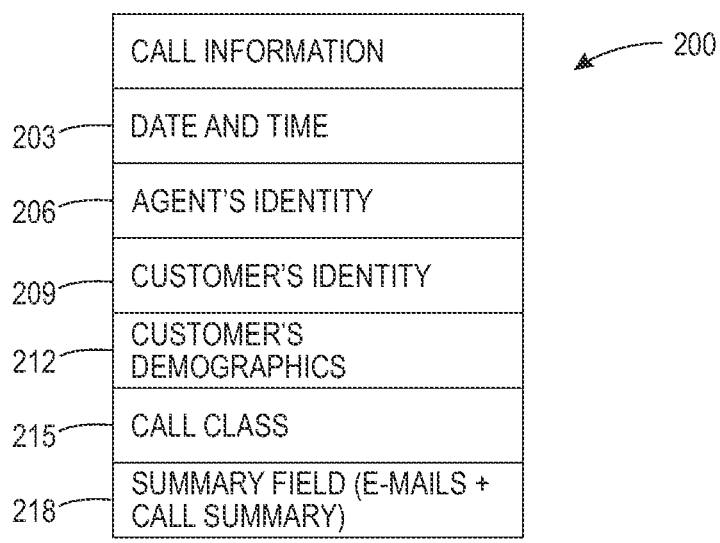
FIG. 2 is an illustration of the types of call information gathered from a database according to systems and methods herein.

In addition to the calls of a given customer, and in order to make predictions more accurately, the system and method herein accounts for the agent who handles the call (and writes up the call summary). FIG. 2 shows an example of the type of data extracted from a call and which may be stored in the database 122. For example, the call information, indicated generally as 200, may be indexed by the date and time of the call 203. Other information may include the identification of the agent 206 and identification of the customer 209. Information about the customer, such as customer demographics 212 may be included. The receiving agent assigns a call class 215, typically at the end of the call. The call summary field 218 includes the agent's call summary and other 'miscellaneous' information. FIG. 3 shows an example of what the content of the fields stored in the database may look like. Indeed, the call summary field 218 may be extremely noisy because of the types of textual data included. There are several causes behind this noise:

The agents tend to spend the least possible amount of time writing the call summaries in order to increase or maintain their throughput. Additionally, the agents use many abbreviations, some of which may be non-standard. Grammar is often approximate, and punctuation is not regular.

The writing style varies from one agent to another. Conventions used by one agent may not necessarily be the same for another. Whereas some agents write sentences in whole, others may use abbreviations, acronyms, or short segments (e.g., sentences without verbs, not well-formed).

Several legacy software products make use of the call summary field to dump miscellaneous ("everything else") information, including machine-generated data. (For example, in FIG. 3, identifiers are included at the beginning of the first line).

Figure 4:
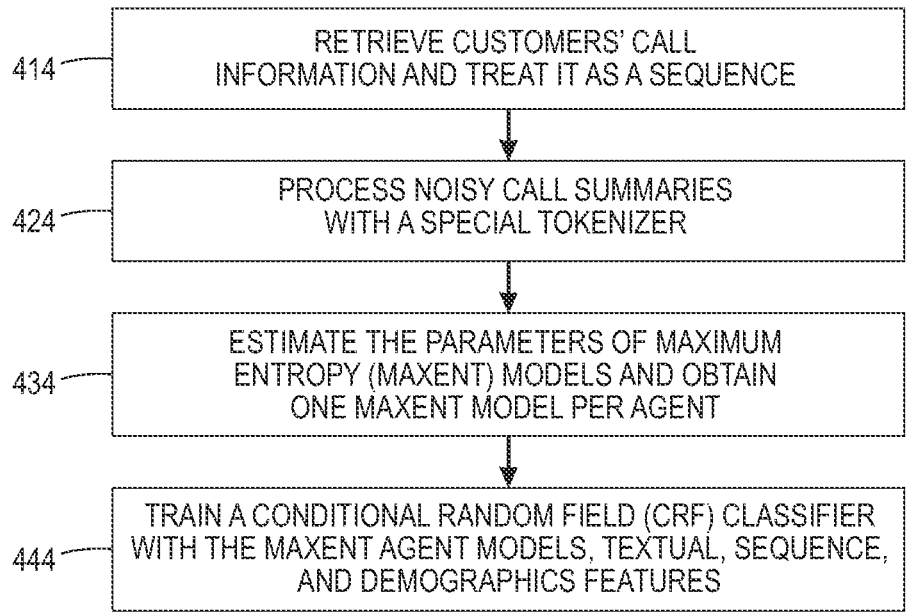
FIG. 4 is a flow diagram illustrating methods herein.

FIG. 4 illustrates the steps for building the prediction model according to systems and methods herein.

Robust Corpus Tokenization of Noisy Call Summaries.

At 414, customer call information is retrieved from the call summary field 218 and treated as a sequence. In order to exploit the call summary field 218 to construct an agent's model, a robust tokenization is needed. Tokenization is the next step in the process for dealing with textual data: the sequence of characters in the input is transformed into a sequence of tokens (or words), as shown at 424.

For most tokenizers, splitting the different tokens inside the text is done via a sequence of regular expressions. According to systems and methods herein, a robust tokenizer is disclosed. The rules of the tokenizer are simpler than those of regular fine-tuned tokenizers for proper English, because a regular English tokenizer would fail to properly extract tokens due to poor syntax and abundant noise. The rules can be applied in the following order (but do not necessarily need to be, as some processing can be performed in parallel or in a slightly different order) on the character sequence input:

a) All sequences of two or more consecutive punctuation marks form a token, e.g., - - - is considered a token.
b) All sequences of two or more consecutive numbers intertwined by one punctuation mark and/or letter (possibly several times) form a token, e.g., 001222586J49/J49L, 555-999-3222, 8:27:58.
c) All remaining punctuation marks are split and form a token, e.g., ARRS.→ARRS,
d) All sequences of letters that contain an upper case letter are split in two tokens, e.g., closeChariton→close, Chariton.
e) The remaining characters are split on spaces, e.g., WOULD NOTIFY→WOULD, NOTIFY.

The output of this step is a tokenized corpus ready to use for the upcoming agent models' construction and feature engineering steps.

Build Multiple MaxEnt Agent Models.

At step 434, the parameters of the maximum entropy (MaxEnt) models are estimated and one MaxEnt model is obtained for each agent. The goal of this step is to build models that characterize each agent separately and help discriminate relevant features among the textual data. These models are also used by the main CRF call prediction classifier as a secondary "opinion" on the next call class. This "opinion" takes the form of a probability distribution on possible classes for an upcoming call. The CRF can then leverage the specialized agent model prediction along with other features, including the ones that the agent model marked as relevant in the textual data, to make its prediction.

For each agent in the call center, this step performs the following:

i. Build an agent's training corpus. This corpus consists of the summaries that have been written by a specific agent. Thus, there is one corpus per agent. Each call summary is considered a document in a corpus.
ii. Train a maximum entropy (MaxEnt) classifier. The MaxEnt classifier predicts the next call given a call summary, the corresponding call class, and a specific agent. (Note: the corresponding call class is used at this step only for training of the MaxEnt models. During the online, prediction step, the call class is unknown and is what is predicted.) In this step, the MaxEnt classifier is used as a secondary classifier since it is able to compute a probability distribution of all possible classes for a call. This probability distribution is used by the main CRF classifier as an input feature to reflect the opinion of the specialized MaxEnt agent models.

iii. Compute the Inverse Document Frequency (IDF) vector for the agent vocabulary. Given the agent's training corpus constructed in step i, above, computing the IDF vector becomes trivial. For each word and pair of consecutive words (2-gram) in the agent's vocabulary, the number of documents (i.e., summaries) in which it occurs is counted. The inverse of the count in maintained in order to compute the IDF score. A separate IDF score is obtained for each agent, referred to as "Agent IDF". By repeating this for all words in the agent vocabulary, the agent vocabulary IDF vector is obtained. This IDF vector is used for training the agent MaxEnt classifier, but also later for training the CRF classifier.

In order to train the MaxEnt classifier, the agent corpus is used. The feature function summarized in Table 1 may be applied to transform each document into a feature vector.

TABLE 1

| Feature type | Feature | Type | Description |
| --- | --- | --- | --- |
| Textual | Word (1-gram) | 1 float/word | For each word (1-gram) in the previous call summary, compute its TF-Agent IDF score |
|  | Pair of words (2-gram) | 1 integer/2-gram | For each Pair of consecutive words (2-gram) in the previous call summary, compute its TF-Agent IDF score |
| Sequence | Class of previous call | 1 Boolean/class | Class of the previous call |

In particular, as shown in Table 1:
a) Textual features represent words appearing in a call's summary. Each word (or pair of consecutive words) is considered a feature and a TF-Agent IDF score is assigned to it, where TF is the term frequency in the call summary, and IDF is the Agent IDF previously computed in step iii, above (the inverse frequency in each agent's corpus) e.g., 0.2/the, 0.7/child.
b) Sequence features represent the class of the previous call made by a customer. The sequence feature may be specified using a Boolean 1 for the matching class and 0 for the others, e.g., for a given customer, the class of his/her previous call on child support is represented by a Boolean 1 for child support, 0 for billing, 0 for inquiry, etc.

According to systems and methods herein, an L-BFGS method may be used for the parameter estimation for training the MaxEnt classifiers. L-BFGS is a limited-memory quasi-Newton code for unconstrained optimization. The result of this step is a MaxEnt agent model capable of providing a call class prediction given the previous call summary for a given agent and its corresponding call class.

Feature Engineering for the CRF Model.

At step 444, a conditional random field (CRF) classifier is trained with the MaxEnt agent models, as well as textual, sequence, and demographics features. The prediction model requires training data and feature engineering in order to be trained. The training data are the sequences of calls that each customer made, ordered chronologically. Feature engineering generates the feature vector from raw training data.

The training data is transformed such that each call in the call sequence is associated to a vector of features. In addition to relying on the MaxEnt agent model previously built, the feature function extracts three other types of features for each call from the training data, as shown in Table 2.

TABLE 2

| Feature type | Feature | Type | Description |
| --- | --- | --- | --- |
| Textual | Word (1-gram) from last summary | 1 float/word | For each word (1-gram) in the last call summary, compute its TF-Agent IDF score. |
|  | Pair of words (2-gram) from last summary | 1 float/2-gram | For each pair of consecutive words (2-gram) in the last call summary, compute its TF-Agent IDF score. |
|  | Word (1-gram) from previous summaries | 1 float/word | For each word (1-gram) in the previous call summaries, compute its TF-Previous agent IDF* time decay score |
|  | Pair of words (2-gram) from previous summaries | 1 float/2-gram | For each pair of consecutive words (2-gram) in the previous call summary, compute its TF-Previous agent IDF*time decay score |
| Sequence | Position of the call in the call sequence | integer | $1^{st}$, $2^{nd}$, or $3^{rd}$, etc. |
|  | Class of previous call (n-1) | 1 Boolean/class | Class of the previous call |
|  | Class of call n-2 | 1 Boolean/class | Class of the call n-2 |
|  | Class of call n-3 | 1 Boolean/class | Class of the call n-3 |
| Demographics | Gender | Boolean | Male or Female |
|  | Age class | 1 Boolean/range | 18-25, 25-35, 35-45, 45-60, 60+ |
|  | Parish/county | 1 Boolean/parish/county in state | Parish/county where the customer lives |
|  | Marital status | 1 Boolean/status | Single, married, divorced, or widowed |
|  | Retired | Boolean | Retired or active |
| Agent | Call prediction | 1 float/class | Each float represents the probability of a class to be the prediction for a call according to MaxEnt agent model. |

In particular, as shown in Table 2:
a) Textual features: Each word (or pair of words in sequence) appearing in the last call's summary is a feature, and a TF-Agent IDF score is assigned to it (1 float/word or 2-gram). Here again, the use of the Agent IDF instead of an IDF over all agents' corpora gives the great advantage to account for the specific style/wording of a given agent and for what is discriminative for this specific agent. In addition to the last call, all preceding calls are similarly taken into account, computing the TF-Agent IDF for each word or 2-gram in each call's summary. Note that for each call, the Agent IDF is the one corresponding to the IDF vector of the agent who took the call. Further, in order to account for the time distance between the calls, so that the further a call is from the last call, the less relevant its features will be, the TF-Agent IDF scores is multiplied by a time decay factor. A non-limiting example of a time decay factor may use the function $f(x)=e^{-\lambda(x)}$ to achieve this effect. Another consequence of the integration of previous calls is the fact that the CRF classifier has more features to rely on for making a prediction, and this is useful because many summaries may be very short, which would result in very few features usable by the classifier. In such cases, statistical classifiers are known to perform poorly.

b) Sequence features: Each sequence of items (i.e., call sequence for one customer) is classified. The class of items n−1, n−2, etc., in a sequence is specified using a Boolean 1 for the matching class and 0 for the others, e.g., 1 for child support, 0 for billing, 0 for inquiry, etc.

c) Demographics features: Each item is also characterized by the demographics features of the customer making the call, e.g., gender, age range, and county. Similarly, each one of these features is described using a Boolean 1 for the matching value, e.g., age range 45-60, and 0 for the other possible values.

d) Agent Feature: The MaxEnt agent models serve as secondary classifiers for the main CRF classifier. Since MaxEnt returns a probability distribution of all classes for a call, these probabilistic scores may be used directly as feature values in the main CRF classifier.

Training the CRF.

The system now has a vector of (textual, sequence, demographics, and agent model) features associated to each call in a call sequence that it can use to train the prediction model.

A linear-chain Conditional Random Fields model can be used for labeling the sequence of calls. Indeed, linear chain CRFs are popular for predicting the classes of a sequence of input data and show high accuracy in their labeling results. The CRF model can be optimized (i.e., trained) with the L-BFGS method with first-order dependencies. As a result of this procedure, a trained CRF model is obtained. The trained CRF model is capable of returning the class of a new call, given the features of the preceding calls in the sequence to which it belongs (i.e., related to the same customer), the demographics of the customer, and the MaxEnt agent model prediction.

At this point, the CRF classifier can be stored in memory by the system in order to be used during the online phase.

Specificities of the CRF Model Application: No Error Propagation.

Usually, in order to predict the class of an item, CRFs rely on the classes predicted automatically for the previous items in a sequence (i.e., predicted by the CRF itself). Typically, once a model has been trained, the training data is not useful anymore and no new training data is available. Depending on the accuracy/performance of the CRF, mislabeling may happen. When that is the case, the error propagates to the next items as long as the sequence goes, and the future predictions suffer from it. This is a well-known weakness of CRFs.

In contrast, the CRF in the system herein is used in such a way that greatly benefits from the agents' operational workflow. Indeed, for each call stored in the database, the system has access to classes that are manually labeled, i.e., by a human/domain expert, after every call. This means that, at each point of a prediction, the CRF may have a label for all the calls preceding the one for which a class prediction has to be computed. A traditional CRF would not have access to the real class of a received call, only its predicted class, which is possibly erroneous. Therefore, the accuracy of the prediction is necessarily better than in common CRF usage.

(Online Phase) Prediction of Future Call Classes.

Figure 5:
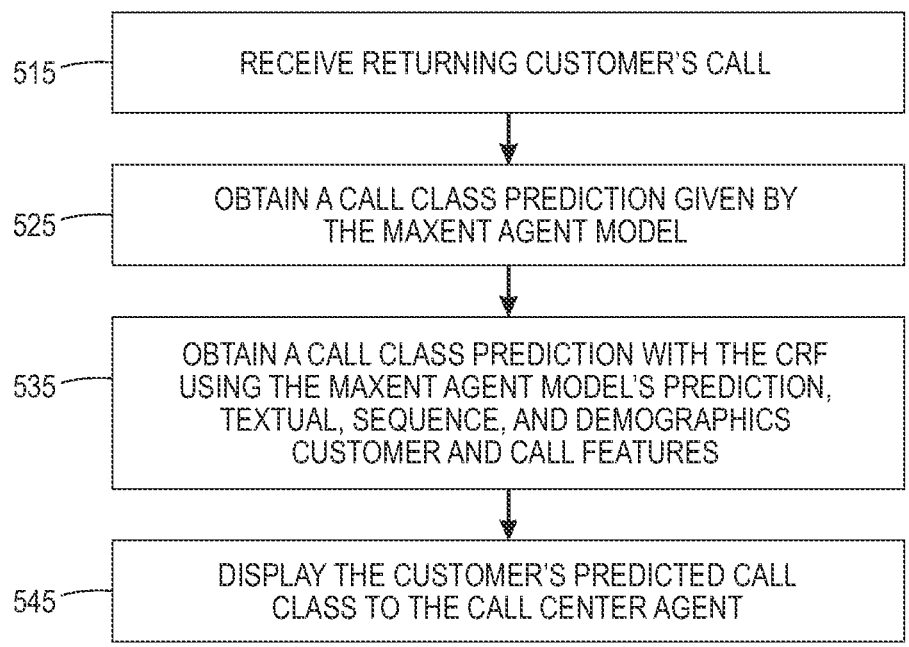
FIG. 5 is a flow diagram illustrating methods herein.

Referring to FIG. 5, once the CRF model trained, it can be used online to make the predictions. Each time an agent finishes up with a call and does the routine post-call processing (i.e., entering call's summary and class), the class prediction of the next call for the involved customer can already be computed. In order to do so, the system uses the textual, sequence, demographics features stored in the database, as well as the agent features computed by the MaxEnt agent models, and computes the feature vector that it submits to the CRF classifier.

That is, at 515, a call from a returning customer is received into the call center. A call class prediction is obtained from the MaxEnt agent model, at 525. At 535, the call class prediction is refined with the CRF by using the MaxEnt agent model's prediction, along with textual, sequence, and demographics customer and call features. Then, at 545, the predicted call class is displayed for the call center agent.

The predicted call class may be stored in the database in order to be ready to display when the customer actually makes his/her next call, or even right after the agent's post-processing for one of his/her calls.

In other words, a call class prediction is made before the call (n+1) is received from the returning customer. When the call (n+1) occurs, it is summarized by the call agent, who then re-labels the call (n+1) with its actual class, which has been determined from the conversation. The actual call class for call (n+1) is then used by the system to make a prediction for the next call (n+2) using the real class of the call (n+1). That is, each time a call is received, the CRF model exploits accurately labeled and current data in order to make the next call class prediction, without the need of being retrained.

(Offline Phase) Adaptation Phase.

The system adapts with more incoming data. Every time an agent inputs a new record in the database, the system learns and adapts its beliefs of the world, which are translated in terms of the MaxEnt and CRF parameters. Such adaptation can happen every time a new record is entered into the database. Practically, however, certain methods and systems herein only trigger it when appropriate. According to systems and methods herein, adaptation may only occur when the aggregate CRF prediction accuracy goes below a threshold, e.g., 80%. By aggregating over one hour or one day, for example, the aggregate CRF prediction accuracy can be obtained. The prediction accuracy can be determined by comparing, for a given call, the prediction made by the CRF and the class manually assigned by the agent. A system user can set the threshold.

The adaptation then leads to repeating the offline phase given new training data (new records accumulated) and thus re-estimating the parameters of the MaxEnt and CRF models. The predictions made by the system will be even more accurate.

For Call Center Agents.

The call center agent can have access to the proposed system through two ways:

1) In real-time, when the agent gets an incoming call from a returning customer. A pop-up window could, for instance, show the predicted call class made by the system.

2) For preparation purposes, once the agent finished the post-call processing, (s)he can consult what the system expects the next call class to be for given customers.

For Call Center Managers.

At any time, the system is accessible to compute the future activity of a call center. This activity can be characterized by the distribution in real-time of future calls as predicted by the system. Call center managers can then have a way to better predict the future call class loads. Actions can consequently be taken, such as on-demand staffing and training.

Figure 6:
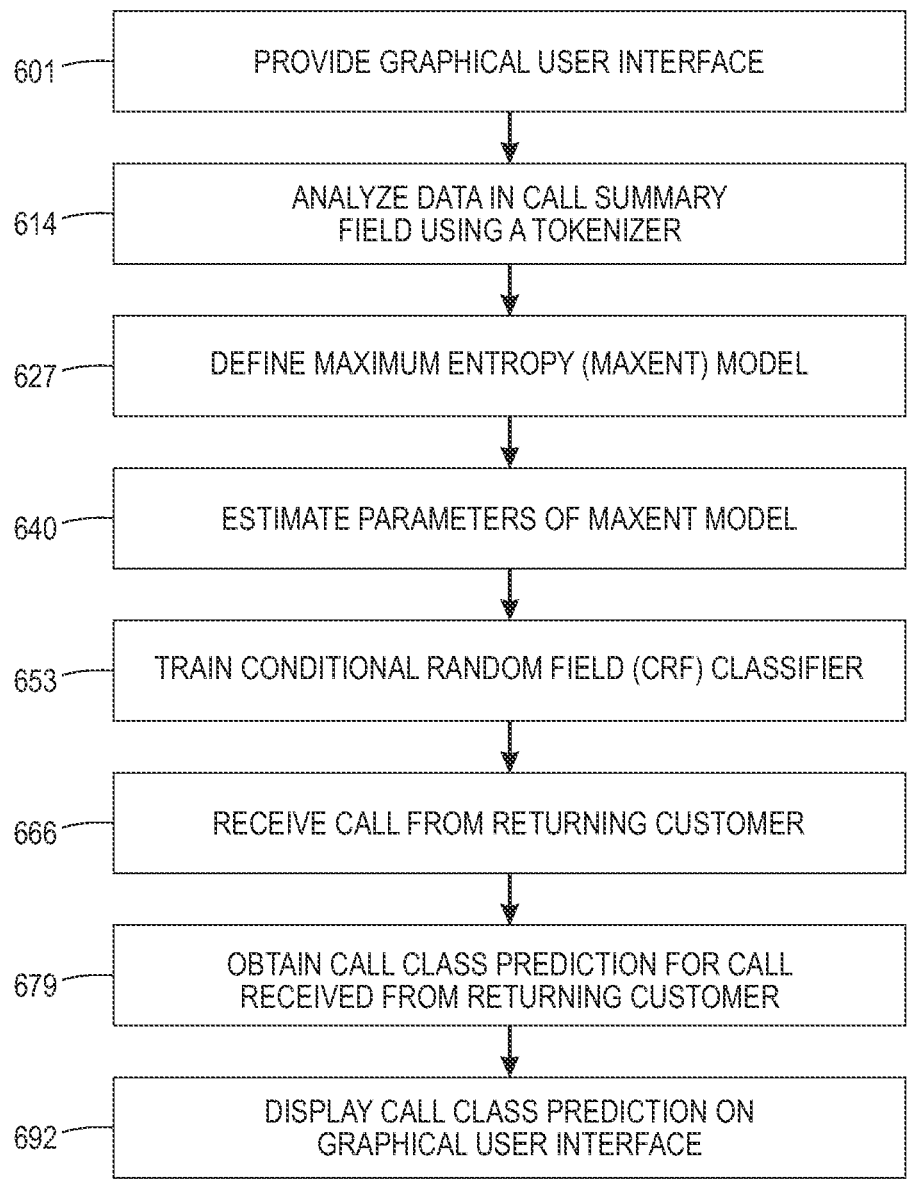
FIG. 6 is a flow diagram illustrating methods herein.

FIG. 6 is a flow diagram illustrating the processing flow of an exemplary method according to systems and methods herein. The method is useful for predicting the class of future customer calls to a call center. At 601, a graphical user interface is provided. The graphical user interface includes call information comprising a call summary field that includes an assigned call class. At 614, data in the call summary field is analyzed using a tokenizer. The tokenizer transforms a sequence of characters in the call summary field into a sequence of tokens. The tokenizer produces tokenized call data. At 627, a maximum entropy (MaxEnt) model is defined. The MaxEnt model produces a probability distribution of all classes for a next call to the call center based on the prior call information. Parameters of the MaxEnt model are estimated for each agent of the call center based on the tokenized call data, at 640. A conditional random field (CRF) classifier is trained using chronologically ordered sequences of prior calls to the call center, at 653. The CRF classifier predicts a class for a new call to the call center based on the prior call information. A new call is received from a returning customer, at 666. A call class prediction for the call received from the returning customer is obtained based on the CRF classifier and the MaxEnt model, at 679. At 692, the call class prediction for the call received from the returning customer is visually displayed on the graphical user interface.

Aspects of the present disclosure are described herein with reference to flowchart illustrations and/or block diagrams of methods, apparatus (systems), and computer program products according to various systems and methods. It will be understood that each block of the flowchart illustrations and/or two-dimensional block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

According to a further system and method herein, an article of manufacture is provided that includes a tangible computer readable medium having computer readable instructions embodied therein for performing the steps of the computer implemented methods, including, but not limited to, the method illustrated in FIG. 6. Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. Any of these devices may have computer readable instructions for carrying out the steps of the methods described above with reference to FIG. 6.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
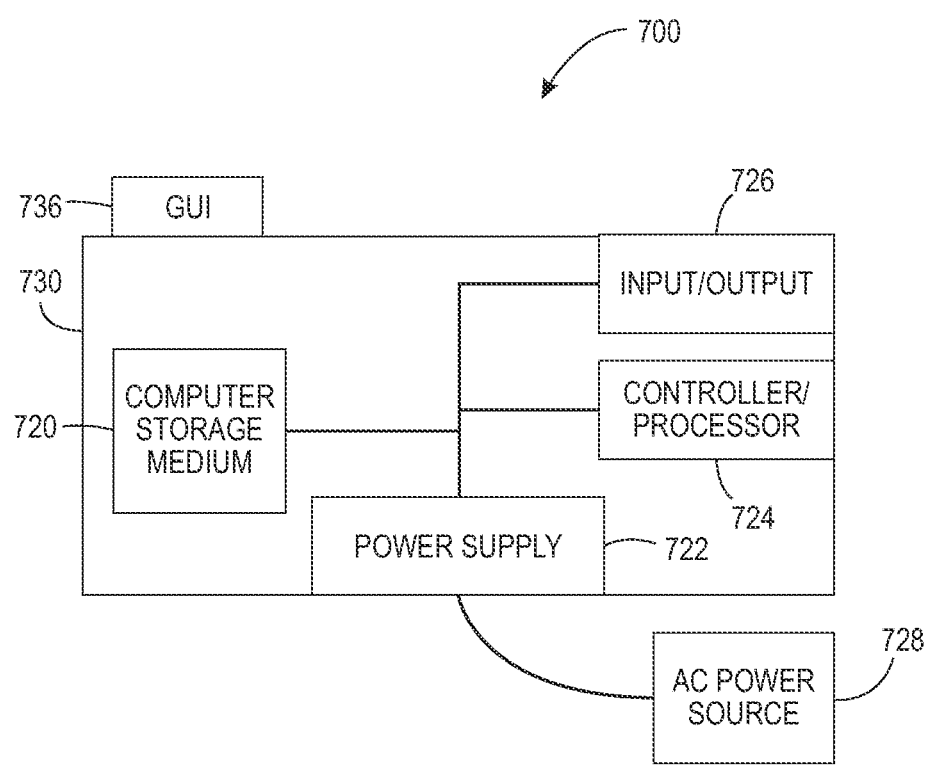
FIG. 7 is a schematic diagram illustrating devices herein.
Figure 8:
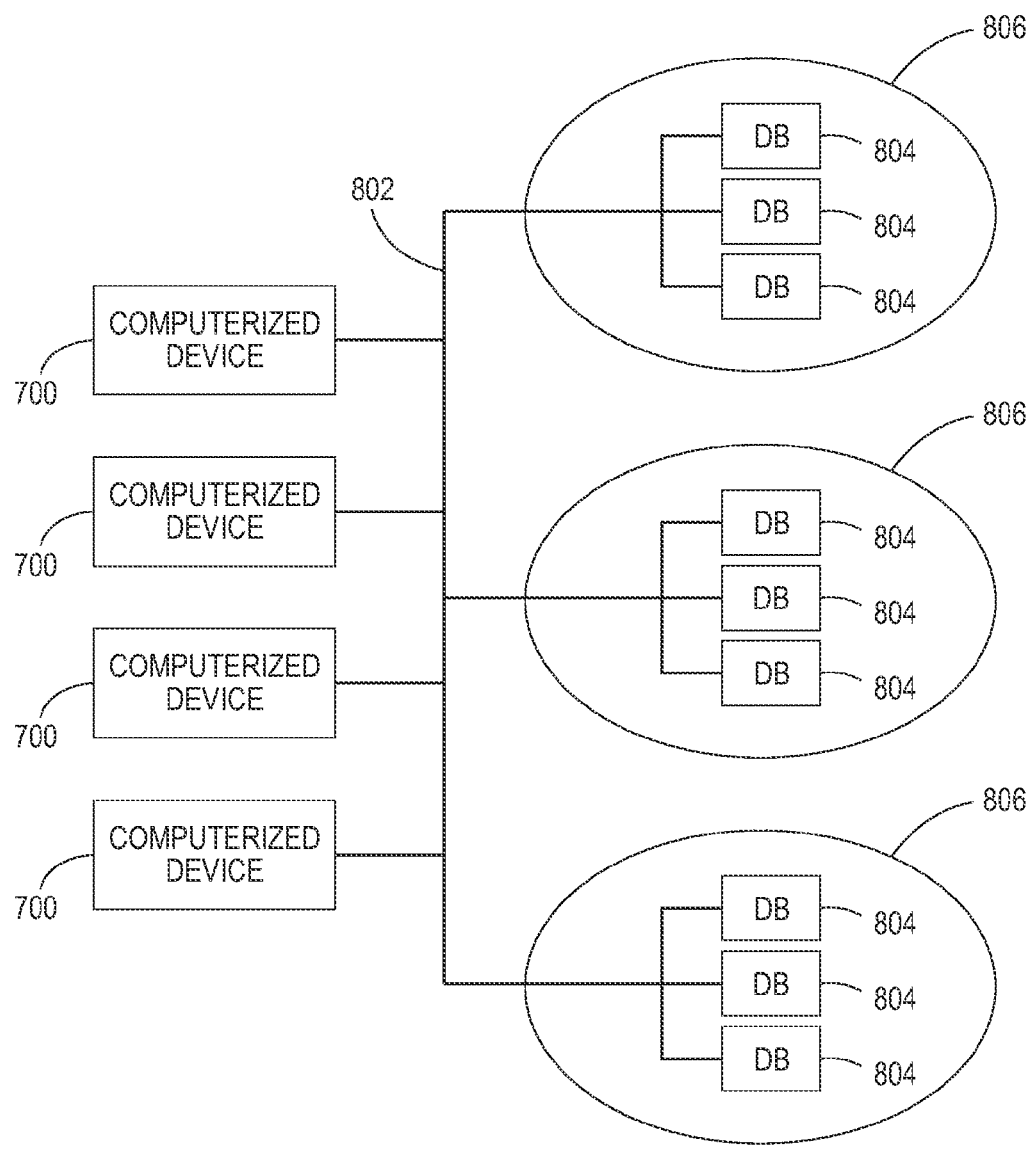
FIG. 8 is a schematic diagram illustrating systems herein.

FIG. 7 illustrates a computerized device 700, which can be used with systems and methods herein, and can comprise, for example, a personal computer, a portable computing device, etc. The computerized device 700 includes a controller/processor 724 and a communications port (input/output) 726 operatively connected to the controller/processor 724. As described above, the controller/processor 724 may also be connected to a computerized network 802 external to the computerized device 700, such as shown in FIG. 8. In addition, the computerized device 700 can include at least one accessory functional component, such as a graphic user interface assembly (GUI) 736 that also operates on the power supplied from the external power source 728 (through the power supply 722).

The input/output device 726 is used for communications to and from the computerized device 700. The controller/processor 724 controls the various actions of the computerized device. A non-transitory computer storage medium 720 (which can be optical, magnetic, capacitor based, etc.) is readable by the controller/processor 724 and stores instructions that the controller/processor 724 executes to allow the computerized device 700 to perform its various functions, such as those described herein. Thus, as shown in FIG. 7, a body housing 730 has one or more functional components that operate on power supplied from the alternating current (AC) power source 728 to the power supply 722. The power supply 722 can comprise a power storage element (e.g., a battery) and connects to an external alternating current power source 728 and converts the external power into the type of power needed by the various components.

In case of implementing the systems and methods herein by software and/or firmware, a program constituting the software may be installed into a computer with dedicated hardware, from a storage medium or a network, and the computer is capable of performing various functions if with various programs installed therein.

In the case where the above-described series of processing is implemented with software, the program that constitutes the software may be installed from a network such as the Internet or a storage medium such as the removable medium.

Those skilled in the art would appreciate that the storage medium is not limited to a peripheral device having the program stored therein, which is distributed separately from the device for providing the program to the user. Examples of a removable medium include a magnetic disk (including a floppy disk), an optical disk (including a Compact Disk-Read Only Memory (CD-ROM) and a Digital Versatile Disk (DVD)), a magneto-optical disk (including a Mini-Disk (MD) (registered trademark)), and a semiconductor memory. Alternatively, the computer storage medium 720 may be a hard disk, or the like, which has the program stored therein and is distributed to the user together with the device that contains them.

As will be appreciated by one skilled in the art, aspects of the devices and methods herein may be embodied as a system, method, or computer program product. Accordingly, aspects of the present disclosure may take the form of an entirely hardware system, an entirely software system (including firmware, resident software, micro-code, etc.) or an system combining software and hardware aspects that may all generally be referred to herein as a "circuit," "module", or "system." Furthermore, aspects of the present disclosure may take the form of a computer program product embodied in one or more computer readable medium(s) having computer readable program code embodied thereon.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a Read Only Memory (ROM), an Erasable Programmable Read Only Memory (EPROM or Flash memory), an optical fiber, a magnetic storage device, a portable compact disc Read Only Memory (CD-ROM), an optical storage device, a "plug-and-play" memory device, like a USB flash drive, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods, and computer program products according to various devices and methods herein. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As shown in FIG. 8, exemplary systems and methods herein may include various computerized devices 700 and databases 804 located at various different physical locations 806. The computerized devices 700 and databases 804 are in communication (operatively connected to one another) by way of a local or wide area (wired or wireless) network 802.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terminology used herein is for the purpose of describing particular devices and methods only and is not intended to be limiting of this disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, the terms 'automated' or 'automatically' mean that once a process is started (by a machine or a user), one or more machines perform the process without further input from any user.

The corresponding structures, materials, acts, and equivalents of all means or step plus function elements in the claims below are intended to include any structure, material, or act for performing the function in combination with other claimed elements as specifically claimed. The descriptions of the various devices and methods of the present disclosure have been presented for purposes of illustration, but are not intended to be exhaustive or limited to the devices and methods disclosed. Many modifications and variations will be apparent to those of ordinary skill in the art without departing from the scope and spirit of the described devices and methods. The terminology used herein was chosen to best explain the principles of the devices and methods, the practical application or technical improvement over technologies found in the marketplace, or to enable others of ordinary skill in the art to understand the devices and methods disclosed herein.

It will be appreciated that the above-disclosed and other features and functions, or alternatives thereof, may be desirably combined into many other different systems or applications. Those skilled in the art may subsequently make various presently unforeseen or unanticipated alternatives, modifications, variations, or improvements therein, which are also intended to be encompassed by the following claims. Unless specifically defined in a specific claim itself, steps or components of the systems and methods herein should not be implied or imported from any above example as limitations to any particular order, number, position, size, shape, angle, color, temperature, or material.

What is claimed is:

1. A method of predicting the class of future customer calls to a call center, said method comprising:
   providing a graphical user interface displaying prior call information comprising a call summary field including an assigned call class;
   analyzing data in said call summary field using a tokenizer, said tokenizer transforming a sequence of characters in said call summary field into a sequence of tokens, producing tokenized call data;
   defining a maximum entropy (MaxEnt) model producing a probability distribution of all classes for a next call to said call center based on said prior call information;
   estimating parameters of said MaxEnt model for each agent of said call center based on said tokenized call data;
   training a conditional random field (CRF) classifier using chronologically ordered sequences of prior calls to said call center, said CRF classifier predicting a class for a new call to said call center based on said prior call information;
   receiving a new call from a returning customer;
   obtaining a call class prediction for said new call being received from said returning customer based on said CRF classifier and said MaxEnt model; and
   displaying said call class prediction for said new call being received from said returning customer on said graphical user interface.

2. The method according to claim 1, said prior call information further comprising contextual call information, demographics features, and time sequence of received calls.

3. The method according to claim 1, said estimating parameters of said MaxEnt model for each agent of said call center further comprising:
   building a training corpus for a specific agent, said training corpus accounting for writing styles of said specific agent in order to discriminate relevant features in textual fields;
   training a MaxEnt classifier to predict the class for a next call based on call summary information for a given call, the call class for said given call, and said specific agent; and
   computing an Inverse Document Frequency (IDF) vector for said specific agent based on said training corpus.

4. The method according to claim 1, further comprising:
   after handling said new call received from said returning customer, assigning a call class for said new call received from said returning customer.

5. The method according to claim 4, further comprising:
   comparing the call class assigned for said new call received from said returning customer to said call class prediction for said call received from said returning customer;
   determining prediction accuracy based on said comparing; and
   adjusting said MaxEnt model and said CRF classifier when said prediction accuracy is below a predetermined threshold.

6. The method according to claim 4, further comprising:
   said CRF classifier predicting a class for a next call to said call center based on said prior call information including the assigned call class for said new call received from said returning customer.

7. A method, comprising:
   analyzing saved call data using a tokenizer, said tokenizer transforming a sequence of characters in a call summary field of said saved call data into a sequence of tokens, producing tokenized call data;
   creating a maximum entropy (MaxEnt) model based on said tokenized call data, said MaxEnt model producing a probability distribution of all classes for a next call to a call center;
   training a conditional random field (CRF) classifier with said MaxEnt model and information from said saved call data, said CRF classifier using chronologically ordered sequences of prior calls to said call center and predicting a class for a new call to said call center based on said saved call data; and
   producing a call class prediction for said new call received from a returning customer based on said CRF classifier and said MaxEnt model.

8. The method according to claim 7, said information from said saved call data further comprising contextual call information, demographics features, and time sequence of received calls.

9. The method according to claim 7, said MaxEnt model being obtained for each agent of a call center.

10. The method according to claim 9, further comprising:
    estimating parameters of said MaxEnt model for each agent of said call center, said estimating further comprising:
    building a training corpus for a specific agent, said training corpus accounting for writing styles of said specific agent in order to discriminate relevant features in textual fields;
    training a MaxEnt classifier to predict the class for a next call based on call summary information for a given call, the call class for said given call, and said specific agent; and
    computing an Inverse Document Frequency (IDF) vector for said specific agent based on said training corpus.

11. The method according to claim 9, further comprising:
    an agent handling said call received from said returning customer designating an assigned call class for said new call received from said returning customer.

12. The method according to claim 11, further comprising:
    comparing said assigned call class for said new call received from said returning customer to said call class prediction for said call received from said returning customer;
    determining prediction accuracy based on said comparing; and
    adjusting said MaxEnt model and said CRF classifier when said prediction accuracy is below a predetermined threshold.

13. The method according to claim 11, further comprising:
    said CRF classifier predicting a class for a next call to said call center based on said saved call data including said assigned call class for said new call received from said returning customer.

14. A system for processing communications in a call center, comprising:
    a database storing records of calls to said call center, said records comprising call information comprising a call summary field that includes an assigned call class;
    a special-purpose telecommunications processor connected to said database, said special-purpose telecommunications processor comprising a tokenizer; and
    a graphical user interface connected to said special-purpose telecommunications processor,
    said special-purpose telecommunications processor analyzing said call summary field in said records of calls using said tokenizer, said tokenizer transforming a sequence of characters in said call summary field into a sequence of tokens, producing tokenized call data, said special-purpose telecommunications processor creating a maximum entropy (MaxEnt) model based on said tokenized call data, said MaxEnt model producing a probability distribution of all classes for a next call to said call center, said special-purpose telecommunications processor training a conditional random field (CRF) classifier with said MaxEnt model and said call information from said records of calls, said CRF classifier using chronologically ordered sequences of prior calls to said call center and predicting a class for a new call to said call center based on said records of calls to said call center stored in said database, said special-purpose telecommunications processor producing a call class prediction for a received call based on said CRF classifier and said MaxEnt model, and said special-purpose telecommunications processor displaying said call class prediction for said received call on said graphical user interface.

15. The system according to claim 14, said call information further comprising:
date and time of a received call;
identity of agent handling said received call;
identity of customer making said received call;
demographics associated with said customer making said received call; and
assigned class of said received call.

16. The system according to claim 14, said special-purpose telecommunications processor creating a maximum entropy (MaxEnt) model and CRF classifier for each agent of said call center.

17. The system according to claim 16, further comprising:
said special-purpose telecommunications processor building a training corpus for a specific agent;
said special-purpose telecommunications processor training a MaxEnt classifier to predict the class for a next call based on call summary information for a given call, the call class for said given call, and said specific agent; and
said special-purpose telecommunications processor computing an Inverse Document Frequency (IDF) vector for said specific agent based on said training corpus.

18. The system according to claim 14, further comprising:
after handling said received call, said special-purpose telecommunications processor obtaining a call class assignment for said received call; and
storing the assigned class for said received call in said database.

19. The system according to claim 18, further comprising:
said special-purpose telecommunications processor comparing said call class assignment for said received call to said call class prediction for said received call;
said special-purpose telecommunications processor determining prediction accuracy based on said comparing; and
said special-purpose telecommunications processor adjusting said MaxEnt model and said CRF classifier when said prediction accuracy is below a predetermined threshold.

20. The system according to claim 18, further comprising:
said CRF classifier predicting a class for a next call to said call center based on said records of calls to said call center stored in said database including the assigned call class for said received call.

* * * * *